March 30, 1965  W. ZORN  3,175,275
HOB WITH INSERTED CUTTER BARS
Filed Dec. 31, 1962  2 Sheets-Sheet 1
*Fig. 1*
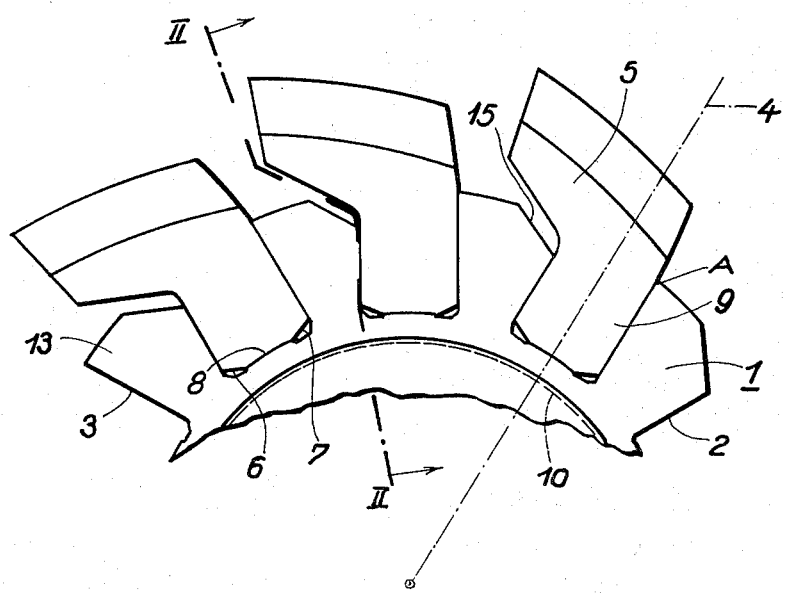
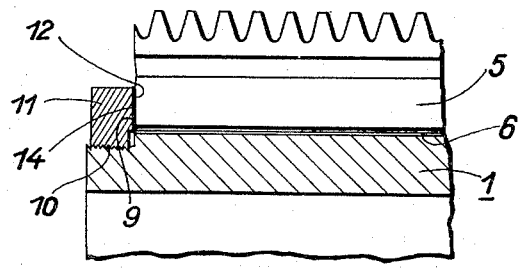
*Fig. 2*

INVENTOR
WALTER ZORN
BY
ATTORNEYS

3,175,275
HOB WITH INSERTED CUTTER BARS
Walter Zorn, Eutingen Baden, Germany, assignor to Walztechnik Saacke-Zorn K.G., Pforzheim, Germany
Filed Dec. 31, 1962, Ser. No. 248,572
Claims priority, application Germany, Jan. 8, 1962,
W 31,422
13 Claims. (Cl. 29—105)

The present invention relates to hobs which are provided with serrated cutter bars, the root parts of which are inserted into corresponding transverse apertures in a tool body and are secured to the tool body by locking means which are applied against the end surfaces of these root parts.

In the prior art of hobs of this type there have been different constructions, all of which, however, had the disadvantage that the end surfaces of the cutter bars and also the ends surfaces of the tool body supporting them, as well as the end surfaces of the locking rings which engage at least with the end surfaces of the cutter bars had to be machined extremely accurately in order to attain the required accuracy of the assembled tool. The costs of manufacture of the finished tools are therefore very high. The prior hobs of this type have the further disadvantage that the locking rings which are applied against the end surfaces of the cutter bars exert considerable radially inwardly directed forces upon these bars which may result in bulging of the central parts of the bars which, in turn, requires the assembled hob to be reground in order to be sufficiently accurate. Aside from the expense caused by such additional grinding, such hobs very often again become inaccurate when in actual use.

It is an object of the present invention to provide a hob of the same type as described above which, however, avoids the mentioned disadvantages of similar hob constructions of prior design and may be produced in a simple manner and at a low cost but so as also to be of the highest possible degree of accuracy.

For attaining the above-mentioned object, the hob according to the invention consists, like the known hobs of this type, of a tool body which is provided with recesses in the peripheral surface thereof into which serrated cutter bars are tightly fitted which are locked in these recesses by suitable locking means which are applied against the end surfaces of the cutter bars to secure them against any displacement in the radial and axial directions relative to the tool body. This is attained according to the present invention by making the end surfaces of the cutter bars of a slightly conical shape and the surfaces of the locking rings which are applied against these end surfaces of a complementary conical shape. The conical end surfaces of the cutter bars and the corresponding conical surfaces of the locking rings may be concentrical and have the same inclination to the axis of the tool body.

According to a preferred embodiment of the invention, the common central axis of the conical surfaces of the opposite ends of the cutter bars are disposed eccentrically to the axis of the tool body and the inclination of the conical surfaces of the locking rings is greater by such a degree as results geometrically from the projection of the parabola which determines the outer edges of the cutter bars upon the axial plane of the tool body. According to another feature of the invention, the gaps which are formed as a result of the eccentricity of the conical end surfaces of the cutter bars and the conical surfaces of the locking rings are filled out by a filling compound which hardens to a very high solidity. Although there may be many other filling compounds which might comply with these requirements, a preferred type is an epoxy resin or a resin with similar properties.

The features and advantages of the present invention will become more clearly apparent from the following detailed description thereof which is to be read with reference to the accompanying drawings, in which:

FIGURE 1 shows an enlarged end view of a part of a hob according to the invention, from which the locking ring has been omitted for the purpose of a clearer illustration of the serrated cutter bars;

FIGURE 2 shows an axial section which is taken along line II—II of FIGURE 1 as seen in the direction of the arrows, but show the hob on a scale of approximately one half of the size of FIGURE 1;

Figure 3:
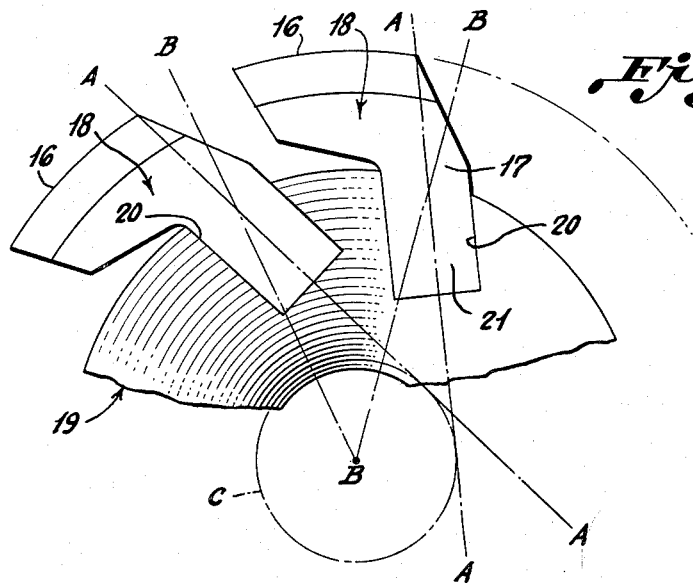
FIG. 3 is a fragmentary elevational view showing one method of forming the cutting surfaces, as well as the conical end surfaces of the cutter bars utilized in the hob of this invention.

As illustrated in the drawings, the tool body 1 of the hob according to the invention is provided with transverse recesses in its peripheral surface which are equally spaced from each other and the opposite walls 2 and 3 of which extend parallel to the central radial planes of the hob, as indicated by the dot-and-dash line 4. The root part of each of the serrated cutter bars 5 which is inserted into one of these recesses is accordingly provided with parallel front and rear surfaces which engage with the walls 2 and 3 of the recess. The bottom of each recess is provided with lateral grooves 6 and 7, so that a raised seat 8 is formed between them on which the bottom surface of the respective cutter bar may fully engage. The root parts of cutter bars 5 fit so tightly into the transverse recesses in the tool body 1 that, after they are inserted, they are rigidly connected to the tool body so that stress concentrations on the periphery of the tool body and distortions of the entire hob will be avoided.

According to the invention, the end surfaces 9 of the cutter bars 5 are made slightly conical, as indicated in FIGURE 2. The inclination of each of these surfaces relative to the associated axis of the cone may, for example, amount to 84°, although it may, of course, also be larger or smaller. The tool body 1 is provided in a conventional manner on both ends with screws theads 10 upon which locking rings 11 are screwed, only one of which is shown in FIGURE 2. These locking rings 11 are provided with conical surfaces 12 which engage upon and are similarly inclined as the conical end surfaces 9 of the cutter bars 5 and thus lock the latter in radial and axial directions to the tool body 1.

According to a modification of the invention, the end surfaces 13 of the webs of the tool body intermediate the adjacent transverse recesses may also be ground conically together with the end surfaces 9 of the cutter bars 5 after the latter are inserted, so that both end surfaces 9 and 13 together form a common conical surface which is complementary to the conical surface 12 of the associated locking ring 11.

According to another preferred embodiment of the invention, it is, however, also possible to omit such a common grinding of the end surfaces 9 and 13 of the cutter bars 5 and the intermediate webs of the tool body.

With particular reference to FIG. 3, there is shown a method of machining the peripheral surfaces 16, as well as the end surfaces 17 of cutter bars 18 and for this purpose there is provided a cylindrical machining fixture 19 having grooves 20 therein for receiving the root portions 21 of the cutter bars 18. It will be noted that the grooves 20 are inclined with respect to radial planes of the fixture 19, such inclination being shown in FIG. 3 by central planes A—A of the grooves 20 and radial planes B—B of the fixture 19. It is to be noted that as shown in FIG. 3, the central planes A—A of the grooves 20 are tangent to a selected circle of eccentricity C. With the cutter bars 18 disposed in the grooves 20 of the fixture 19, the peripheral surfaces 16 of the cutter bars 18 are suitably machined and ground and simultaneously therewith, the end surfaces 17 of the cutter bars 18 are machined and ground to a conical shape having an angle with respect to the axis B of the fixture 19 of the order of approximately 84 degrees. This manner of machining and grinding serves to provide the peripheral surfaces 16 of the cutter bars 18 with the proper relief angle so as to provide for proper cutting operation of the cutter bars when mounted in the body of the hob in a manner to be presently described and this manner of machining and grinding the end surfaces 17 of the cutter bars 18 results in the forward sides of the root portions 21 being of greater length than the rear sides of such root portions.

Figure 4:
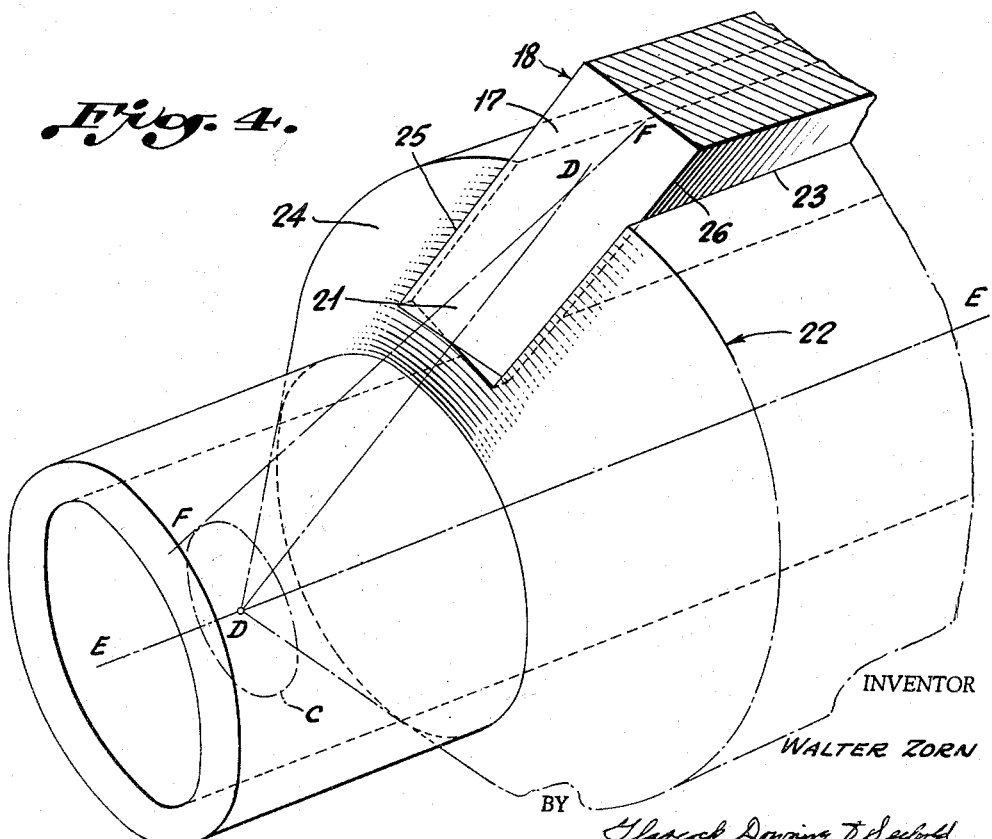
FIG. 4 a fragmentary view in perspective showing a modified form of the invention.

With particular reference to FIG. 4, there is shown a hob body 22 having radial grooves 23 therein for receiving the root portions 21 of the cutter bars 18 and it is to be noted that the end faces 24 of the body 22 are conical and that the apex D of such cone lies on the axis E—E of the body 22. However, in view of the manner in which the conical end surfaces 17 of the cutter bars 18 was formed, the generatrix indicated by the dot-dash line F—F in FIG. 4 will not fall along the line D—D indicating the generatrix of the conical end surface 24 of the body 22, but will be tangent to the circle C which was selected as shown in FIG. 3, for the machining operation. For this reason, the longer forward side 25 of the root portion 21 of the cutter bars 18 will project a slight distance outwardly of the conical end surface 24 of the body 22, while the shorter rear side 26 of the root portion 21 of the cutter bars 18 will be disposed a slight distance inwardly of the conical end surface 24 of the body 22, all as clearly shown in FIG. 4. Thus, it can be said that the conical end surfaces 17 of the root portion 21 of the cutter bars 18 are eccentric with respect to the conical surface 24 of the body 22 by an amount equal to the radius of the circle of eccentricity C.

In the form of the invention shown in FIG. 4, the cutter bars 18 are retained in position by clamping rings in the same manner as described above in connection with FIGS. 1 and 2 and such rings will contact the projecting edge portions of the cutter bars 18 to hold the same in place in the grooves 23 of the body 22.

According to the preferred embodiment of the invention as above described in connection with FIG. 4, the inclination of the conical surfaces 12 of the locking rings 11 is also greater by the amount which results geometrically by the projection of the parabola which determines the outer edges of the cutter bars upon the axial plane of the tool body. Despite the eccentricity between the conical end surfaces 17 of the cutter bars and the conical surfaces 12 of locking rings 11, the last-mentioned procedure insures that the two conical surfaces will engage with each other so well that the individual cutter bars 18 will be firmly secured in a fixed position in the axial and radial directions within the transverse recesses in the tool body 22. Since the radial outwardly directed forces which act upon the individual cutter bars when the hob is in operation are only very small, the relatively small inclination of the mentioned conical surfaces of approximately 84° is amply sufficient to insure that the cutter bars will be firmly locked to the tool body 22 in the radial directions. Therefore, since the locking rings 11 only exert very small radial inwardly directed force upon the end surfaces of the cutter bars, distortions and especially a bulging of the bars at the center of the hob in the outward direction will be avoided so that the tool when completely assembled will have very accurate dimensions and can therefore also carry out very accurate work. Since the tangential forces which occur during the operation of the hob are taken up exclusively by the walls of the transverse recesses or grooves in the tool body 22, and since the root parts of the cutter bars are fitted so tightly between these walls that no stress concentrations will occur on the periphery of the tool body, the assembled hob will act like a homogenous element even when subjected to high cutting pressures without any danger that any distortions thereof will occur. The hob is therefore extremely resistant to any changes in shape and dimensions and the workpieces produced by it will therefore also be very accurate.

According to a further very preferred embodiment of the invention, a thin layer 14 of a filling compound which is capable of hardening to a very high solidity may be provided between end surfaces 9 of the cutter bars and possibly also the end surfaces 13 of the webs of the tool body 1 and the conical surfaces of locking rings 11. Such an intermediate layer 14 may be applied in any of the embodiments of the invention as previously described. It consists preferably of a quickly setting filling compound such as an epoxy resin, although any other casting resins may also be used, provided that they comply in the hardened condition to the solidity requirements which have to be fulfilled in the present case. Although it is already known in hobs of this type in which cutter bars are mounted in transverse peripheral recesses to embed the root parts of these bars within the transverse recesses in a quickly setting filler, for example, with an ethoxylene resin base, this manner of securing the serrated bars did not achieve the homogeneity of the entire tool which is attained according to the invention by the intimate positive engagement of the wall surfaces of the root parts of the cutter bars with the corresponding wall surfaces of the transverse recesses in the tool body. This prior manner of securing the cutter bars could therefore also not attain the favorable features of the finished tool which are attained according to the invention insofar as its permanent accuracy in size and nondistortability during its operation, especially under high cutting pressures, are concerned According to the invention, however, the thin layer of a filling compound which hardens to a very high solidity and is inserted between the end surfaces 9 of the cutter bars and possibly also the end surfaces 13 of the webs intermediate the adjacent transverse recesses in the tool body 1 and the conical surfaces 12 of the locking rings 11 is not employed for securing the cutter bars 5 within the hob body 1, but merely for the purpose of compensating for any inaccuracies in size and alignment between these surfaces and therefore primarily for reducing the cost of manufacture of these parts. This applies especially to that embodiment of the invention shown in FIG. 4 in which the end surfaces 17 of the cutter bars 18 and possibly also the end surfaces 24 of the body 22 are not ground as a unit, but in which the conical end surfaces 17 of the cutter bars 18 are already ground during the production of these bars so that, when the hob is assembled, these conical end surfaces 17 and possibly also the conical end surfaces 24 of the body 22 will be disposed eccentrically to the associated conical surfaces 12 of locking rings 11 as previously described in detail. According to the invention, the gaps which are formed by this relative eccentricity between these conical surfaces are therefore eliminated by being filled out by the rigidly hardening filling compound. In combination with the tight fit between the root parts of the cutter bars 18 and the walls of the transverse recesses or grooves in the tool body 22 this manner of also securing the bars on their end surfaces produces a maximum degree of homogeneity of the entire assembled tool which is similar to that of an integral element and far superior to that of prior tools of a similar type.

The locking rings 11 do not have to be screwed against the end surfaces of the tool body 1 by a thread 10, as shown in the drawings, but they may also be secured in the axial direction relative to the tool body 1 in any other suitable manner, for example, by means of radial or tangential locking pins or tangential wedge gibs, or by being shrunk upon the respective flanges on the tool body 1.

Since the tangential forces which are exerted upon the cutter bars 5 during the use of a hob according to the invention are taken up exclusively by the wall surfaces 2 and 3 of the transverse recesses in the tool body 1, the proper dimensions of these wall surfaces are dependent not only upon the transverse forces acting upon the wall surfaces 3 but primarily upon the tilting moment of the cutter bars 5 about the edges A, as indicated in FIGURE 1. According to the invention it therefore suffices if the rear wall surfaces 3 of the recesses as seen in the cutting direction of the hob are made of a relatively large size, whereas the front wall surfaces 2 may be made of a considerably smaller size since under a cutting pressure they only have to take up the surface pressure which results from the tilting moment. The front wall surfaces 2 of the recesses may therefore be made relatively small and of a much lower height than the opposite rear wall surfaces 3. This, in turn, permits the rear edges of the intermediate webs between the adjacent recesses in the tool body to be cut or ground off as indicated in FIGURE 1 at 15. As the result of this, the cutter heads of bars 5 may be designed so as to project considerably in the cutting direction, and the connecting portion between each cutter head and the root part of the respective cutter bar which is inserted into one of the apertures in the tool body may be made of the most suitable shape to take up the bending stresses which are caused by the cutting pressure upon the cutter heads and to transmit them to the tool body 1.

It is evident from the foregoing description that, in comparison to hobs of a similar type according to prior designs, the hob according to the invention may not only be produced at a considerably lower cost but that it also has the advantage of being practically free of internal stresses which, in turn, insures that the hob may be made of accurate dimensions and will also retain these dimensions when in operation so as to produce accurate workpieces. As the result of the inventive design of the webs intermediate the adjacent recesses containing the root parts of the cutter bars it is possible to extend the cutting edges of the cutter heads very far forwardly in the cutting direction and thus to gain a considerable amount of material which permits the cutter heads to be reground many times. Consequently, the hob according to the invention may be used for a much longer time before it has to be finally replaced or provided with a new set of cutter bars. Finally, despite the very high solidity of the finished tool according to the invention, its simple construction permits it to be easily assembled and also very easily disassembled to permit the cutter bars to be quickly exchanged. Since the inventive design of the hob does not require any constrictions or other dangerous notches or recesses to be provided in the root parts of the cutter bars, the danger of breakage of these bars is very strongly reduced and it is also possible to make the webs intermediate the transverse recesses in the tool body 1 very strong and likewise free of any weakening recesses so that also the danger that any of these parts might break is practically avoided. At the points where the parallel wall surfaces of the root parts of the cutter bars merge with the end surfaces 9, these wall surfaces may be made slightly wedge-shaped in order to facilitate the insertion of the bars into the transverse recesses in the tool body. It is then possible to press all of the cutter bars 5 simultaneously into the transverse recesses by the application of a sufficiently high axial force. The special design of the end surfaces 9 of the cutter bars and the conical surfaces 12 of the locking rings, and especially also the fact that according to the preferred embodiment of the invention the conical end surfaces 9 of the cutter bars are already ground during the actual production of these bars insure that, when the tool is completely assembled, the cutter profiles of the individual bars 5 will be in exactly the same axial position relative to each other as that in which they were during their production. The individual cutter profiles of the complete hob have therefore the highest possible accuracy relative to each other. This accuracy of the individual cutter profiles relative to each other is further increased due to the fact that the bottom surfaces of the root parts of all of the cutter bars engage without any gaps with the corresponding bottom surfaces 8 of the transverse recesses in the tool body 1. This high degree of radial accuracy of the finished tool is also attainable by very simple means which, in turn, results in a considerable reduction in the cost of production of the entire tool.

Although my invention has been illustrated and described with reference to the preferred embodiments thereof I wish to have it understood that it is in no way limited to the details of such embodiments, but is capable of numerous modifications within the scope of the appended claims.

Having thus fully disclosed my invention, what I claim is:

1. A hob comprising a cylindrical body, said body having a plurality of circumferentially spaced grooves extending longitudinally through said body, the sidewalls of each grooves being parallel to each other and parallel to a plane passing through the axis of said body and the longitudinal center line of the groove, a cutter bar disposed in each groove and engaging said sidewalls with a drive fit and engaging the bottom wall of the groove, the opposite ends of each cutter bar being conical and of an angle of the order of approximately 84 degrees with respect to the longitudinal axis of the cutter bar and clamping rings removably received on opposite ends of said body, the inner radial surfaces of said rings being conical and having approximately the same inclination as the conical end surfaces of said cutter bars, the conical surfaces on said rings engaging the conical end surfaces on said cutter bars to exert a relatively small inwardly directed radial force on the ends of said cutter bars to retain said cutter bars in said grooves and maintain said cutter bars straight.

2. A hob as defined in claim 1, in which the opposite ends of said body between said grooves are conical and of an angle of the order of approximately 84 degrees with respect to the axis of said body.

3. A hob as defined in claim 2, in which the conical surfaces on said clamping rings engage the conical surfaces on the ends of said body and the conical surfaces on the end of said cutter bars to provide a rigid assembly.

4. A hob as defined in claim 1, in which said clamping rings are threadedly received on opposite ends of said body.

5. A hob as defined in claim 1, in which the leading wall of each groove is of less height than the trailing wall of each groove and in which each cutter bar comprises a root portion received in the groove and a radially outer cutter portion of greater width than said root portion and projecting forwardly in the direction of rotation of said hob to overlie a portion of said body between said grooves.

6. A hob as defined in claim 1, in which there is metal-to-metal contact between at least certain portions of said clamping rings and at least certain portions of the conical end surfaces of each cutter bar, end spaces between said clamping rings and the conical end surfaces of said cutter bars being filled with a rapid hardening compound.

7. A hob as defined in claim 6, in which said compound comprises an epoxy resin.

8. A hob comprising a cylindrical body, said body having a plurality of circumferentially spaced grooves extending longitudinally through said body, the sidewalls of each groove being parallel to each other and parallel to a plane passing through the axis of said body and the longitudinally center line of the groove, a cutter bar disposed in each groove and engaging said sidewalls with a drive fit and engaging the bottom wall of the groove, the opposite ends of each cutter bar being conical and of an angle of the order of approximately 84 degrees with respect to the longitudinal axis of the cutter bar, the opposite ends of said body being conical and of an angle of the order of approximately 84 degrees with respect to the axis of said body, the conical ends of each cutter bar being so formed that one side of said cutter bar is of greater length than the other side, whereby the ends of each cutter bar on one side will project slightly beyond the conical end surfaces of said body and the ends of each cutter bar on the other side will be disposed slightly inwardly of the conical end surfaces of said body and clamping rings removably received on opposite ends of said body, the inner radial surfaces of said rings being conical and having approximately the same inclination as the conical end surfaces of said cutter bars and the conical end surfaces of said body, the conical surfaces on said rings engaging in metal-to-metal contact the projecting conical end surfaces of said cutter bars to exert a relatively small inwardly directed radial force on the ends of said cutter bars to retain said cutter bars in said grooves and maintain said cutter bars straight.

9. A hob as defined in claim 8, in which said clamping rings are threadedly received on opposite ends of said body.

10. A hob as defined in claim 8, in which the leading wall of each groove is of less height than the trailing walls of each groove and in which each cutter bar comprises a root portion received in the groove and a radially outer cutter portion of greater width than said root portion and projecting forwardly in the direction of rotation of said hob to overlie a portion of said body between said grooves.

11. A hob as defined in claim 8, in which any spaces between the conical end surfaces of said cutter bars and said clamping rings are filled with a rapid hardening compound.

12. A hob as defined in claim 11, in which any spaces between said rings and the conical end surfaces of said body are filled with a rapid hardening compound.

13. A hob as defined in claim 11, in which said compound comprises an epoxy resin.

References Cited in the file of this patent

UNITED STATES PATENTS

| 1,031,030 | Turney | July 2, 1912 |

FOREIGN PATENTS

| 13,441 | Great Britain | July 23, 1892 |
| 15,683 | Great Britain | July 11, 1906 |
| 16,019 | Great Britain | July 16, 1906 |
| 4,034 | Great Britain | May 17, 1912 |
| 798,643 | Great Britain | July 23, 1958 |
| 473,245 | France | Sept. 14, 1914 |